(12) United States Patent
Asano

(10) Patent No.: US 6,975,522 B2
(45) Date of Patent: Dec. 13, 2005

(54) DEVICE AND METHOD FOR INHIBITING POWER FLUCTUATION

(75) Inventor: Shigetaka Asano, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 78 days.

(21) Appl. No.: 10/648,440

(22) Filed: Aug. 27, 2003

(65) Prior Publication Data

US 2004/0041547 A1    Mar. 4, 2004

(30) Foreign Application Priority Data

Aug. 28, 2002 (JP) ............................ 2002-249421

(51) Int. Cl.⁷ .............................................. H02H 7/10

(52) U.S. Cl. ....................... 363/50; 323/274

(58) Field of Search ................ 363/50; 323/224, 323/282, 274; 307/43, 52

(56) References Cited

U.S. PATENT DOCUMENTS

| | | | | |
|---|---|---|---|---|
| 5,933,649 A | * | 8/1999 | Lim et al. | 713/322 |
| 6,252,384 B1 | * | 6/2001 | Arai et al. | 323/282 |
| 2003/0169605 A1 | * | 9/2003 | Asano | 363/46 |

FOREIGN PATENT DOCUMENTS

JP          11-308109          11/1999

* cited by examiner

Primary Examiner—Adolf Berhane
(74) Attorney, Agent, or Firm—Arent Fox PLLC

(57) ABSTRACT

A power fluctuation inhibiting device for effectively inhibiting fluctuation of power supply voltage that is supplied to internal circuits. The inhibiting device includes a power fluctuation measuring circuit for measuring peaks in the fluctuation of the power supply voltage produced when the internal circuits are operated. A clock signal control circuit adjusts phases of clock signals provided to respective ones of the internal circuits in accordance to the peak measuring result to substantially offset the fluctuation peaks produced when the internal circuits are operated.

16 Claims, 10 Drawing Sheets

✕✕ : Unstable

DEVICE AND METHOD FOR INHIBITING POWER FLUCTUATION

CROSS-REFERENCE TO RELATED APPLICATIONS

This application is based upon and claims the benefit of priority from the prior Japanese Patent Application No. 2002-249421, filed on Aug. 28, 2002, the entire contents of which are incorporated herein by reference.

BACKGROUND OF THE INVENTION

The present invention relates to a semiconductor device, and more particularly, to a power fluctuation inhibiting device for inhibiting power supply voltage fluctuation of a semiconductor device.

Due to the higher integration and higher operation speed of recent semiconductor devices, a plurality of digital circuits are synchronized with each other at high speeds. More specifically, a plurality of CMOS circuits in the digital circuits are synchronized with one another so that through current simultaneously flows in the CMOS circuits. This increases the peak value of the through current and increases power supply voltage fluctuation. As a result, the digital circuits, which are activated by the same power supply, may function erroneously. Alternatively, errors in the output signal of an analog circuit may increase and noise may be produced. Fluctuation of the power supply voltage caused by through current must thus be inhibited.

FIG. 1 is a waveform diagram illustrating a prior art example of a method for inhibiting power supply voltage fluctuation by using clock signals with different phases to inhibit fluctuation of power supply voltage caused by through current.

When a plurality of digital circuits are operated in synchronism with a clock signal CLK11, a noise n1 is produced in synchronism with the rising edge of the clock signal CLK11 in a power supply V1. After voltage decreases due to the through current resulting from counter electromotive force produced by an inductance component of a power supply line and negative feedback of a power supply circuit, the noise n1 increases the voltage. In such a manner, when a plurality of digital circuits are driven by the same clock signal CLK11, through current is synchronously produced. This increases the peak value of the noise n1.

When the digital circuits are divided into those driven by the clock signal CLK11 and those driven by a clock signal CLK12, for example, different noises n2 and n3 are produced in the power supply V1. In this case, the dividing ratio of the circuits is 1:1.

Japanese Laid-Open Patent Publication No. 11-308109 describes the above technology.

In the above prior art technology, the different phases of the clock signals inhibit the peak fluctuation value of the power supply voltage. However, when the number of noises produced in the power supply V1 increases, the peak inhibiting effect decreases depending on the dividing ratio of the circuits. Accordingly, the reduction of the noise produced in the power supply V1 cannot be ensured. Further, noise resulting from the power supply noise would still be produced in circuits operated in accordance with the power supply V1.

The peak value of the noise produced in the power supply V1 must be measured by a spectral analyzer or a digitizer. However, it is difficult to measure and confirm the inhibiting effect of the power supply voltage fluctuation obtained by using clock signals with different phases when dividing circuits and setting phases to effectively inhibit the peak value of the noise.

SUMMARY OF THE INVENTION

One aspect of the present invention is a device for inhibiting fluctuation of power supply voltage that is supplied to a plurality of internal circuits. The internal circuits are operated in accordance with a plurality of clock signals. The device includes a power fluctuation measuring circuit for measuring fluctuation peaks in the power supply produced when the internal circuits are operated and generating a measuring signal. A clock signal control circuit is connected to the power fluctuation measuring circuit to adjust phases of the clock signals provided to respective ones of the internal circuits so that the fluctuation peaks in the power supply voltage produced when the internal circuits are operated are substantially offset by one another.

Another aspect of the present invention is a semiconductor device including a plurality of internal circuits, each operated in accordance with a respective one of a plurality of clock signals. An inhibiting device inhibits fluctuation of power supply voltage that is supplied to the internal circuits. The inhibiting device includes a power fluctuation measuring circuit for measuring fluctuation peaks in the power supply produced when the internal circuits are operated and generating a measuring signal. A clock signal control circuit is connected to the power fluctuation measuring circuit to adjust phases of the clock signals provided to respective ones of the internal circuits so that the fluctuation peaks in the power supply voltage produced when the internal circuits are operated are substantially offset by one another.

A further aspect of the present invention is a method for inhibiting fluctuation of power supply voltage that is supplied to a plurality of internal circuits. The method includes providing a plurality of internal circuits with a plurality of clock signals, respectively, and adjusting phases of the clock signals to substantially offset a plurality of fluctuation peaks of the power supply voltage that are produced when the internal circuits are operated.

A further aspect of the present invention is a method for inhibiting fluctuation of power supply voltage that is supplied to a plurality of internal circuits including a relatively large first internal circuit and relatively small second internal circuits. The method includes providing the plurality of internal circuits with a plurality of clock signals, respectively, and adjusting phases of the clock signals to substantially offset a first peak in the fluctuation of the power supply voltage that is produced when the first internal circuit is operated with second peaks in the fluctuation of the power supply voltage that are produced when the second internal circuits are operated.

A further aspect of the present invention is a method for inhibiting fluctuation of power supply voltage that is supplied to an n number of digital circuits. The method includes providing an n number of clock signals to the n number of digital circuits, respectively, and when a cycle of noise produced in the power supply voltage during operation of each digital circuit is 2/n of a cycle of the respective clock signal, offsetting a plurality of fluctuations of the power supply voltage produced with the n number of digital circuits by deviating cycles of the n number of clock signals from one another by 1/n of a cycle.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
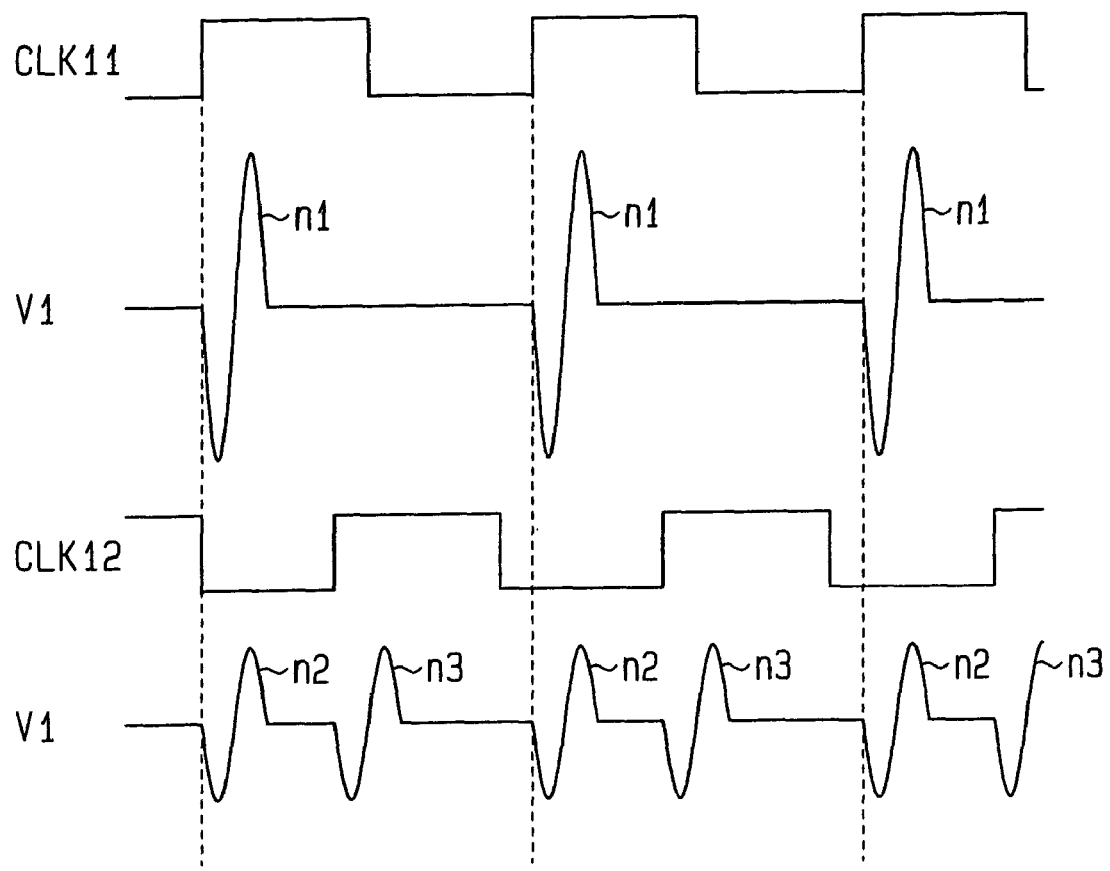
FIG. 1 is a waveform diagram illustrating the inhibition of power supply voltage fluctuation in the prior art.

In the drawings, like numerals are used for like elements throughout.

Figure 2:
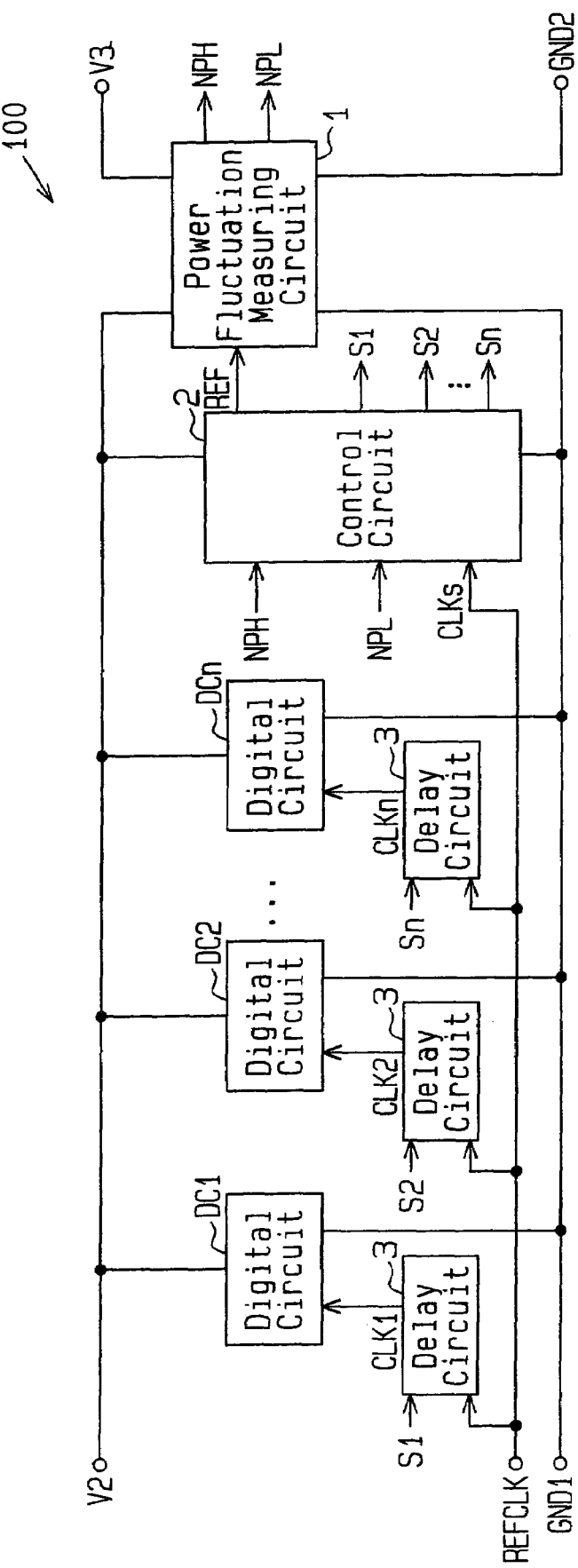
FIG. 2 is a schematic block diagram of a power fluctuation inhibiting device according to a preferred embodiment of the present invention.

Referring to FIG. 2, a semiconductor device 100 includes a plurality of digital circuits (internal circuits) DC1 to DCn, a power fluctuation measuring circuit 1, a control circuit 2, and a plurality of delay circuits 3. The digital circuits DC1 to DCn are connected to a high potential power supply V2 and a ground GND1, which is a low potential power supply. The digital circuits DC1 to DCn are operated in accordance with clock signals CLK1 to CLKn, respectively. The control circuit 2 and the delay circuits 3 function as a clock control circuit. The power fluctuation measuring circuit 1 and the clock control circuit configure a power fluctuation inhibiting device. The power fluctuation inhibiting device is formed on the same semiconductor substrate (not shown) as the digital circuits DC1 to DCn.

The power fluctuation measuring circuit 1 is supplied with power from a high potential power supply V3 and a ground GND2, which is a low potential power supply, to detect the voltage fluctuation at the power supply V2 and the ground GND1. The power fluctuation measuring circuit 1 provides the control circuit 2 with a first detection signal NPL, which indicates the detection result of a high potential peak value of power supply noise, and a second detection signal NPL, which indicates the detection result of a low potential peak value. It is preferred that the power supply V3 and the ground GND2 use power that is more stable than that of the power supply V2 and the ground GND1.

The control circuit 2 is supplied with power from the power supply V2 and the ground GND1 to provide the power fluctuation measuring circuit 1 with a digital signal REF, which sets a reference voltage. Further, the control circuit 2 is operated in accordance with a clock signal CLKs (reference clock signal REFCLK) to perform a calculation process in accordance with the first detection signal NPH and the second detection signal NPL to generate selection signals S1 to Sn. The selection signals S1 to Sn are provided to the respective ones of the delay circuits 3. Further, each delay circuit 3 is provided with the reference clock signal REFCLK.

Figure 3:
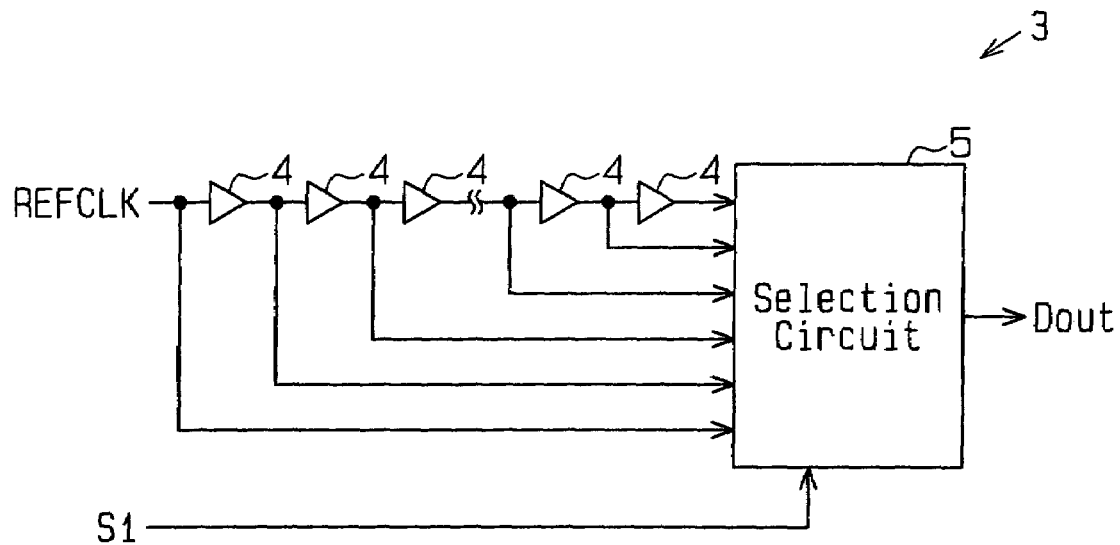
FIG. 3 is a schematic circuit diagram of a delay circuit in the power fluctuation inhibiting device of FIG. 2.

The delay circuit 3 will now be described with reference to FIG. 3. FIG. 3 shows the delay circuit 3 provided with the selection signal S1. The delay circuit 3 includes an (n−1) number of buffer circuits 4, which are connected to each other in series, and a selection circuit 5. The reference clock signal REFCLK is provided to the first stage buffer circuit 4 and the selection circuit 5. Each buffer circuit 4 provides its output clock signal to the selection circuit 5.

The delay circuit 3 selects either the reference clock signal REFCLK or the output clock signal of one of the buffer circuits 4 and provides the selected clock signal Dout to the associated digital circuit. In this manner, the delay circuits 3 provide the digital circuits DC1 to DCn with the selected clock signals Dout as the clock signals CLK1 to CLKn, respectively. Each selection signal selects the number of the buffer circuits 4 in the associated delay circuit 3. Further, each selection signal is provided to the associated delay circuit 3 to adjust the delay time of the clock signal provided to the corresponding digital circuit.

Figure 4:
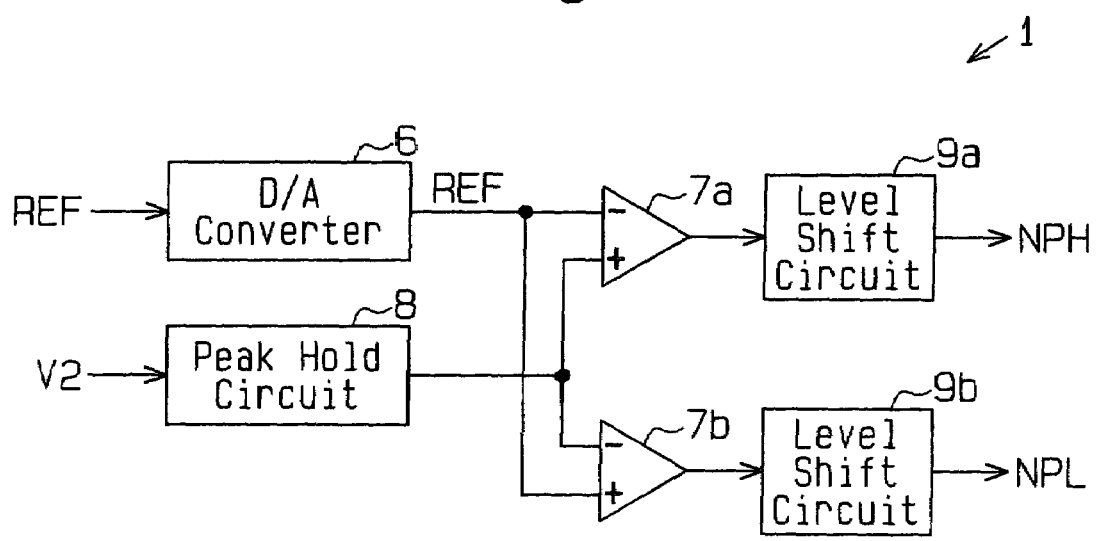
FIG. 4 is a schematic circuit diagram of a power fluctuation measuring circuit in the power fluctuation inhibiting device of FIG. 2.

The power fluctuation measuring circuit 1 will now be discussed with reference to FIG. 4. The power fluctuation measuring circuit 1 includes a D/A converter 6, two comparators 7a and 7b, a peak hold circuit 8, and two level shift circuits 9a and 9b. The D/A converter 6 receives the digital signal REF and converts the digital signal REF to an analog reference voltage signal. More specifically, the D/A converter 6 generates an analog high reference voltage and an analog low reference voltage in accordance with the digital signal REF. Then, the D/A converter 6 supplies the comparator 7a with the analog high reference voltage and the comparator 7b with the analog low reference voltage.

The peak hold circuit 8 holds a high potential peak and a low potential peak at the power supply V2 and provides the comparators 7a and 7b with the held high potential peak value and the low potential peak value.

The comparator 7a compares the high reference voltage from the D/A converter 6 with the high potential peak value of the power supply V1 and provides the comparison result to the level shift circuit 9a. The comparator 7b compares the low reference voltage from the D/A converter 6 with the low potential peak value of the power supply V1 and provides the comparison result to the level shift circuit 9b.

The level shift circuit 9a adjusts the voltage of the output signal of the comparator 7a so that the output signal of the comparator 7a corresponds to the input level of the control circuit 2. Then, the level shift circuit 9a provides the voltage-adjusted first detection signal NPH to the control circuit 2. The level shift circuit 9b adjusts the voltage of the output signal of the comparator 7b so that the output signal of the comparator 7b corresponds to the input level of the control circuit 2. Then, the level shift circuit 9b provides the voltage-adjusted second detection signal NPL to the control circuit 2. Accordingly, when the high potential peak value of the power supply V2 is greater than the high reference voltage set by the digital signal REF, the level shift circuit 9a generates the first detection signal NPH at a high level. Further, when the low potential peak value of the power supply V2 is less than the low reference voltage set by the digital signal REF, the level shift circuit 9b generates the second detection signal NPL at a high level.

Figure 5:
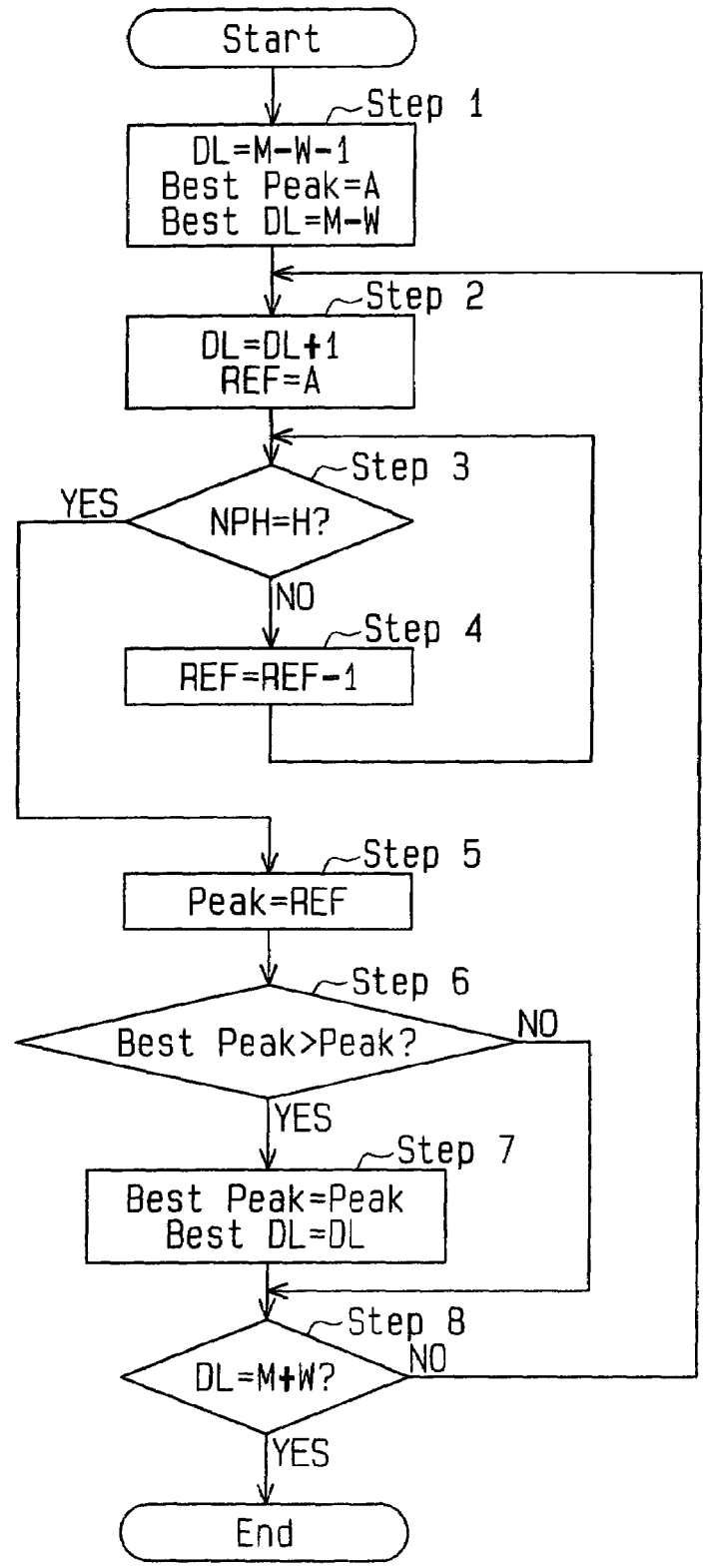
FIG. 5 is a flowchart illustrating the operation of a control circuit in the power fluctuation inhibiting device of FIG. 2.
Figure 6:
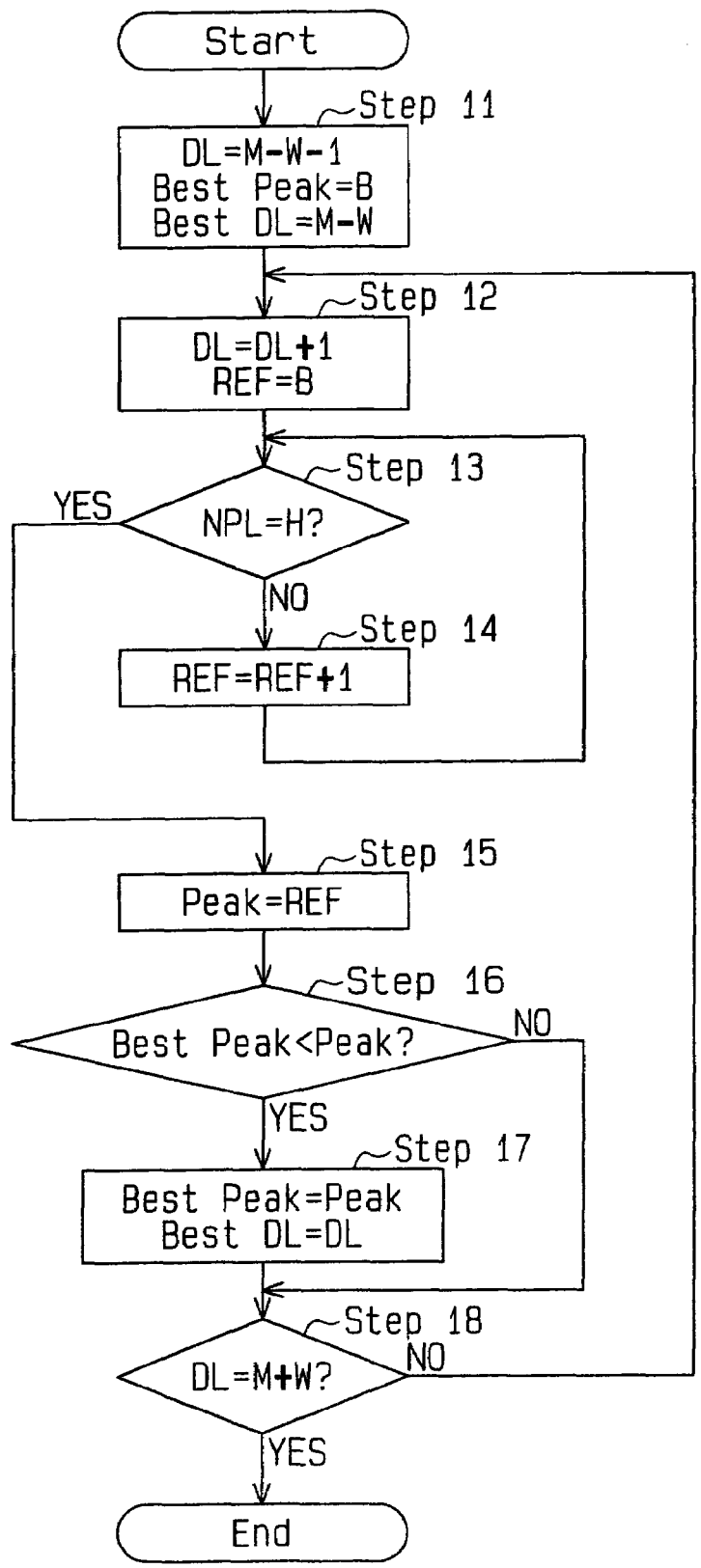
FIG. 6 is a flowchart illustrating the operation of the control circuit in the power fluctuation inhibiting device of FIG. 2.

The power fluctuation inhibiting performed by the control circuit 2 will now be discussed with reference to FIGS. 5 and 6. FIGS. 5 and 6 illustrate controls for inhibiting power fluctuation by adjusting the timing of the clock signal in one of the digital circuits.

FIG. 5 illustrates the procedures for suppressing the high potential peak of the power supply V2. When the power supplies V2 and V3 are activated, the control circuit 2 first sets the number DL (DL≧0) of the buffer circuits 4 for setting the delay time of the delay circuit 3 as M−W−1 with the selection signal S1 (step 1). M represents the number of the buffer circuits 4, and W represents the number of the buffer circuits 4 that are adjustable (addable) based on the number M. Further, in step 1, the minimum peak voltage value A is set as a Best Peak. Additionally, the number M−W of the buffer circuits 4 that minimizes the peak voltage is set as a Best DL.

Figure 7:
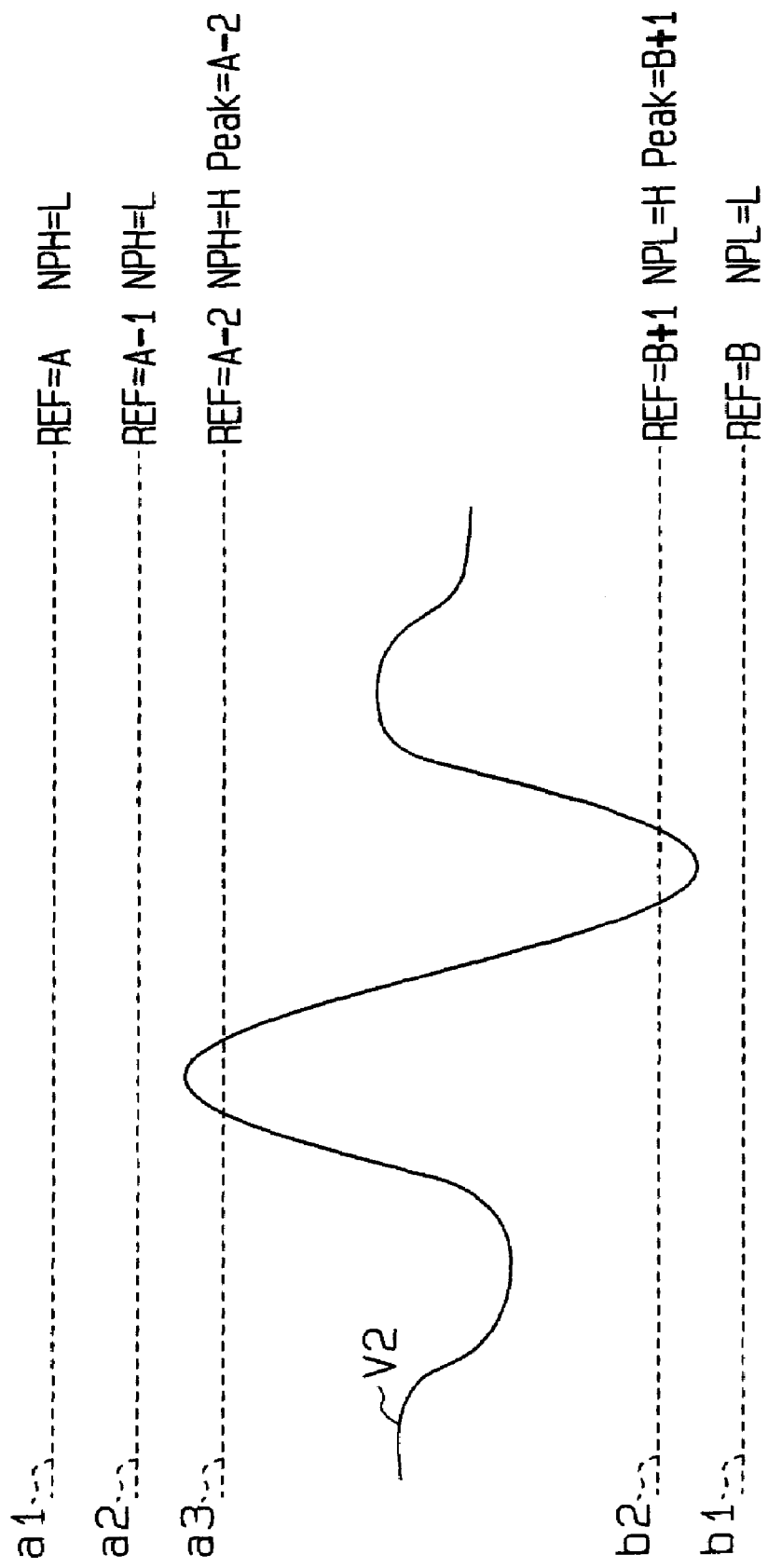
FIG. 7 is a diagram illustrating the operation of the power fluctuation measuring circuit in FIG. 4.

Then, the control circuit 2 adds one to DL and sets the digital signal REF provided to the power fluctuation measuring circuit 1 as A (step 2). The power fluctuation measuring circuit 1 converts the digital signal REF set in A to an analog value and compares its analog voltage a1 with the voltage of the power supply V2. As shown in FIG. 7, when the peak value of the voltage of the power supply V2 is less than voltage a1, the power fluctuation measuring circuit 1 provides the control circuit 2 with the first detection signal NPH at a low level.

The control circuit 2 then determines whether the first detection signal NPH is high (step 3). Since the first detection signal NPH is low in this state, the control circuit 2 subtracts one from the set value A of the digital signal REF (step 4) and returns to step 3. When the digital signal REF is set to the voltage a3, which is converted to an analog value, by repeating steps 3 and 4, the power fluctuation measuring circuit 1 generates the first detection signal NPH at a high level. As a result, the control circuit 2 proceeds from step 3 to step 5, and the control circuit 2 stores the set value A−2 of the digital signal REF corresponding to voltage a3 as a peak value Peak.

The control circuit 2 then determines whether the peak value Peak is less than the Best Peak, which has already been stored (step 6). In this state, Peak is A−2 and less than A. Thus, the control circuit 2 stores A−2 as the Best Peak and stores the number DL of the buffer circuits 4 in this state as the Best DL (step 7). If the peak value Peak is less than Best Peak in step 6, the control circuit 2 proceeds to step 8.

The control circuit 2 then determines whether the number DL of the buffer circuits 4 has reached M+W (step 8). If the number DL has not reached M+W, the control circuit 2 proceeds to step 2 and adds one to DL (changes the value of the selection signal S1) to set the value of the digital signal REF again to A. That is, the number of the buffer circuits 4 is increased by one. In this state, steps 3 to 8 are repeated. The control circuit 2 repeats such processes until DL becomes equal to M+W and ends processing when DL becomes equal to M+W. As a result, in step 7, the control circuit 2 stores the minimum value of the high potential peak of the power supply V2 as the Best Peak and stores the number of buffer circuits 4 in this state as the Best DL. In this manner, the control circuit 2 sequentially changes the value of the selection signal, compares the reference voltage and the peak voltage with the changed selection signal, and determines the value of the selection signal that minimizes the peak voltage.

FIG. 6 illustrates the procedures for suppressing the low potential peak of the power supply V2. When the power supplies V2 and V3 are activated, the control circuit 2 first sets the number DL (DL≧0) of the buffer circuits 4 for setting the delay time of the delay circuit 3 as M−W−1 with the selection signal S1 (step 11). Further, in step 11, the minimum peak voltage value B is set as a Best Peak. Additionally, the number M−W of the buffer circuits 4 that minimizes the peak voltage is set as a Best DL.

Then, the control circuit 2 adds one to DL and sets the digital signal REF provided to the power fluctuation measuring circuit 1 as B (step 12). The power fluctuation measuring circuit 1 converts the digital signal REF set in B to an analog value and compares its analog voltage b1 with the voltage of the power supply V2. As shown in FIG. 7, when the low peak value of the voltage of the power supply V2 is greater than voltage b1, the power fluctuation measuring circuit 1 provides the control circuit 2 with the second detection signal NPL at a low level.

The control circuit 2 then determines whether the second detection signal NPL is high (step 13). Since the second detection signal NPL is low in this state, the control circuit 2 adds one to the set value B of the digital signal REF (step 14) and returns to step 13. When the digital signal REF is set to the voltage b2, which is converted to an analog value, by repeating steps 13 and 14, the power fluctuation measuring circuit 1 generates the second detection signal NPL at a high level. As a result, the control circuit 2 proceeds from step 13 to step 15, and the control circuit 2 stores the set value B+1 of the digital signal REF corresponding to voltage b2 as a low peak value Peak.

The control circuit 2 then determines whether the peak value Peak is greater than the Best Peak, which has already been stored (step 16). In this state, Peak is B+1 and greater than B. Thus, the control circuit 2 stores B+1 as the Best Peak and stores the number DL of the buffer circuits 4 in this state as the Best DL (step 17). If the peak value Peak is not greater than Best Peak in step 16, the control circuit 2 proceeds to step 8.

The control circuit 2 then determines whether the number DL of the buffer circuits 4 has reached M+W (step 18). If the number DL has not reached M+W, the control circuit 2 proceeds to step 12 and adds one to DL to set the value of the digital signal REF again to B. That is, the number of the buffer circuits 4 is increased by one. In this state, steps 13 to 18 are repeated. The control circuit 2 repeats such processes until DL becomes equal to M+W and ends processing when DL becomes equal to M+W. As a result, in step 17, the control circuit 2 stores the minimum value of the low potential peak of the power supply V2 as the Best Peak and stores the number of buffer circuits 4 in this state as the Best DL.

The procedures of FIGS. 5 and 6 are repeated as required to adjust the number of the buffer circuits 4 in each delay circuit 3, or the phase of the clock signal provided to each of the digital circuits DC1 to DCn. This suppresses the peak value of the voltage fluctuation in the power supply V2.

Figure 8:
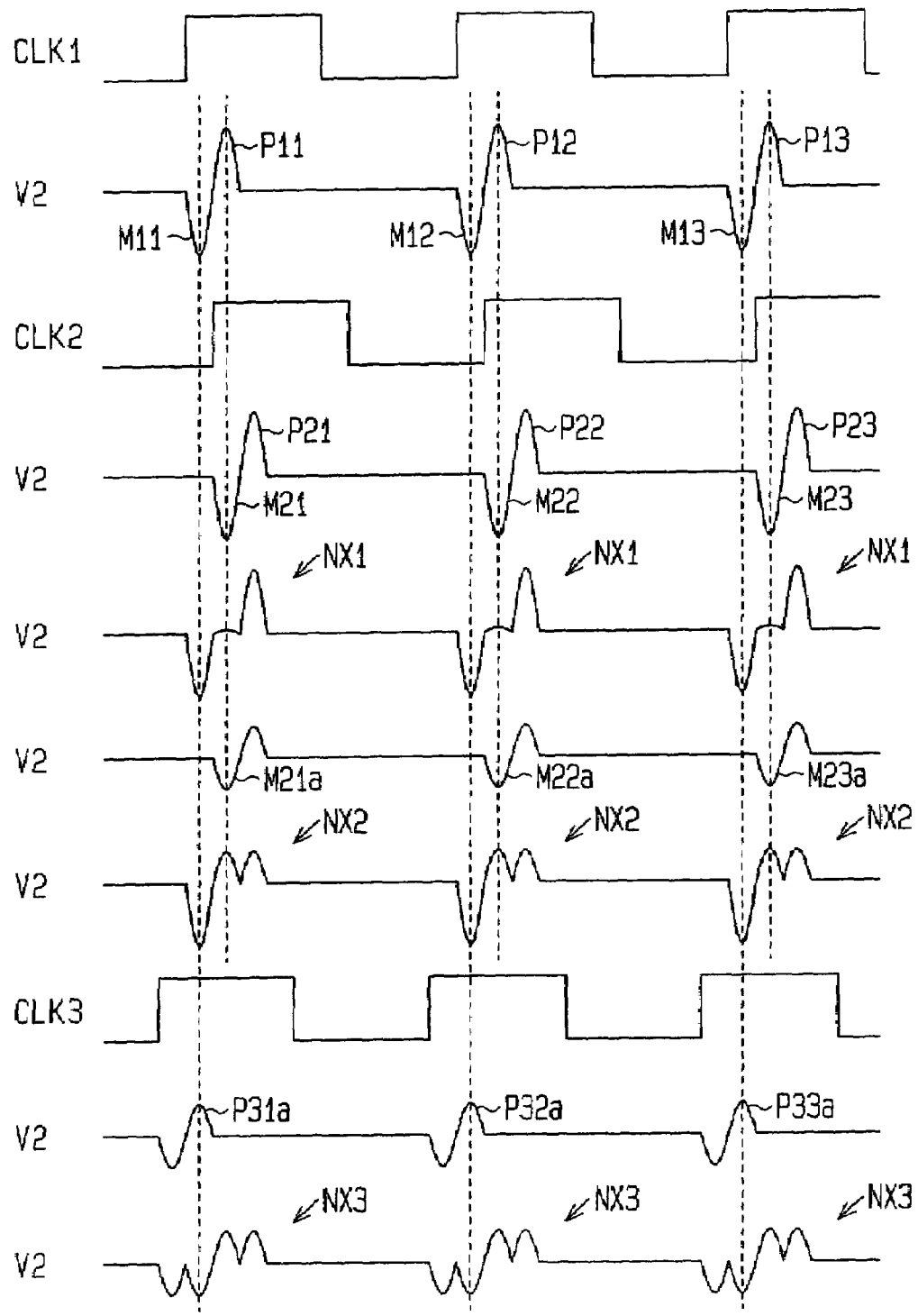
FIG. 8 is a waveform diagram illustrating the power fluctuation inhibiting operation of the power fluctuation inhibiting device of FIG. 2.

FIG. 8 illustrates the power supply fluctuation inhibiting performed by the control circuit 2. For example, when the digital circuit DC1 is operated in accordance with clock signal CLK1, noises P11, M11, P12, M12, P13, and M13 are generated when the clock signal CLK1 goes high in the power supply V2. Further, when the digital circuit DC2 is operated in accordance with clock signal CLK2, noises P21, M21, P22, M22, P23, and M23 are generated when the clock signal CLK2 goes high in the power supply V2. The control circuit 2 adjusts the phases of the clock signals CLK1 and CLK2 so that noises P11 and M21 offset each other, noises P12 and M22 offset each other, and noises P13 and M23 offset each other. The phase adjustment reduces the number of noise peaks by one half as shown by the adjusted noises N×1 in FIG. 8. The peaks of the adjusted noises N×1 are preferably suppressed through the procedures described and related with FIGS. 5 and 6.

An example in which noises generated by digital circuits having different circuit scales will now be described. The control circuit 2 adjusts the phases of the clock signals CLK1 and CLK2 so that the noises P11 to P13, which are generated by a digital circuit having a relatively large circuit scale, and the noises M21a to M23a, which are generated when the clock signal CLK2 goes high by a digital circuit having a relatively small circuit scale, offset each other, respectively. Adjusted noises N×2 having suppressed peak values are generated in the power supply V2 when the noises P11 to P13 and the noises M21a to M23a offset each other, respectively. Due to such processing, the peak values of the noises P11, M11, P12, M12, P13, and M13 are suppressed to generate the adjusted noises N×3.

Figure 9:
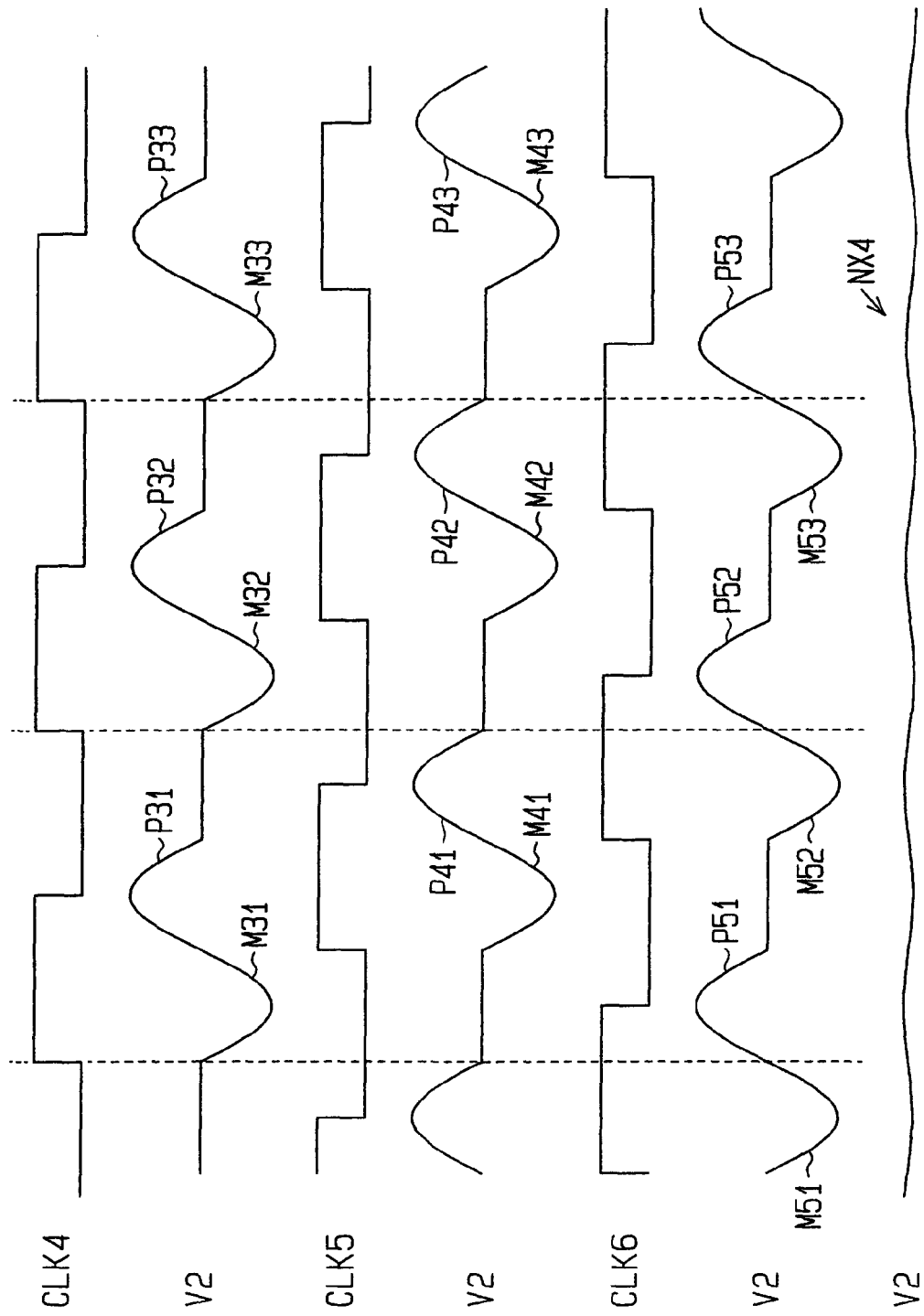
FIG. 9 is a waveform diagram illustrating the power fluctuation inhibiting operation of the power fluctuation inhibiting device of FIG. 2.

FIG. 9 illustrates the power fluctuation inhibiting performed if noises M31, P31, M32, P32, M33, and P33 are generated when the digital circuits are provided with clock signals. The noises M31, P31, M32, P32, M33, and P33 are generated during two thirds of each cycle of a clock signal CLK4. In such a case, the control circuit 2 adjusts the phases of clock signals CLK4 to CLK6 so that the cycles of the clock signals CLK4 to CLK6, which are provided to a respective one of the digital circuits, are deviated by one third of a cycle from one another. As a result, the noises M31, P31, M32, P32, M33, and P33 generated by the clock signal CLK4, the noises M41, P41, M42, P42, M43, and P43 generated by the clock signal CLK5, and the noises M51, P51, M52, P52, M53, and P53 generated by the clock signal CLK5 offset one another respectively. This lowers the peak value of the adjusted noises N×4 generated in the power supply V2 and smoothes the voltage of the power supply V2.

Figure 10:
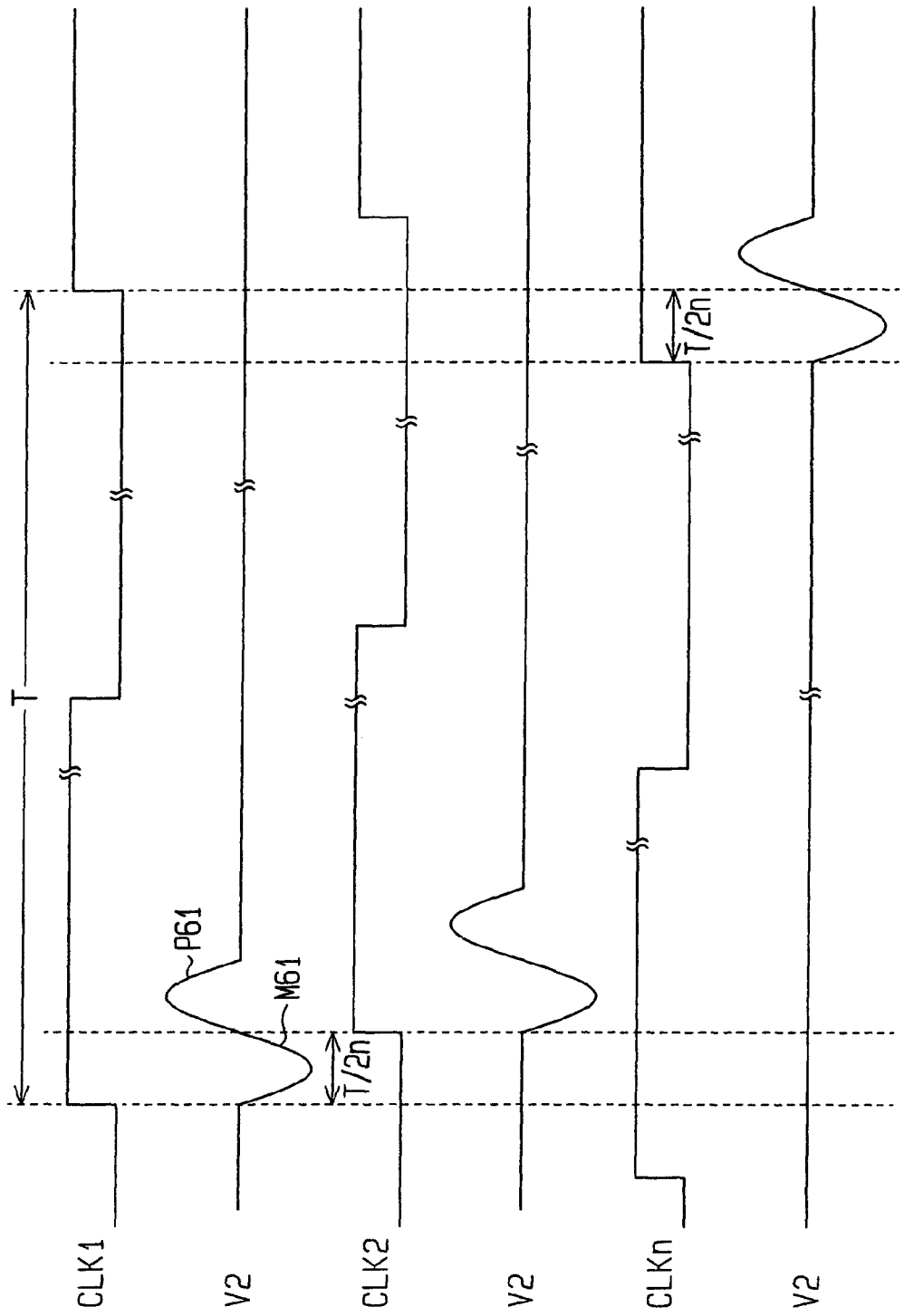
FIG. 10 is a waveform diagram illustrating the power fluctuation inhibiting operation of the power fluctuation inhibiting device of FIG. 2.

FIG. 10 illustrates the power fluctuation inhibiting performed if noises M61 and P61 are generated when clock signals are provided to an n number of digital circuits. The noises M61 and P61 are generated during 2/n of each cycle of the clock signal CLK1. In such a case, the control circuit 2 adjusts the phases of the clock signals CLK1 to CLKn so that the cycles of the clock signals CLK1 to CLKn are deviated by 1/n of a cycle from one another. This offsets the noises generated in the digital circuits with one another and suppresses the peak value of the adjusted noise.

Figure 11:
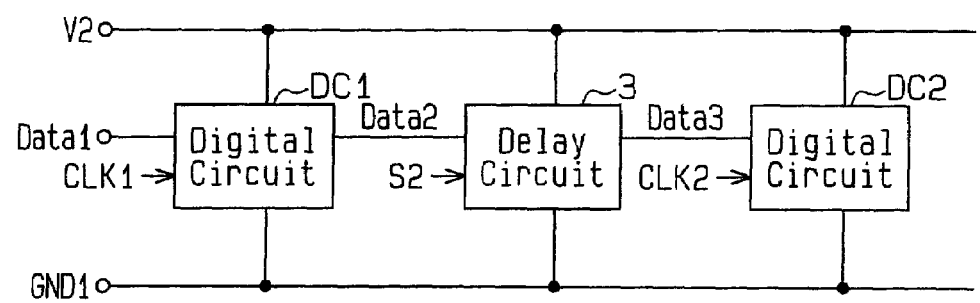
FIG. 11 is a schematic block diagram of a semiconductor device provided with digital circuits and a delay circuit to perform the power fluctuation inhibiting operation.
Figure 12:
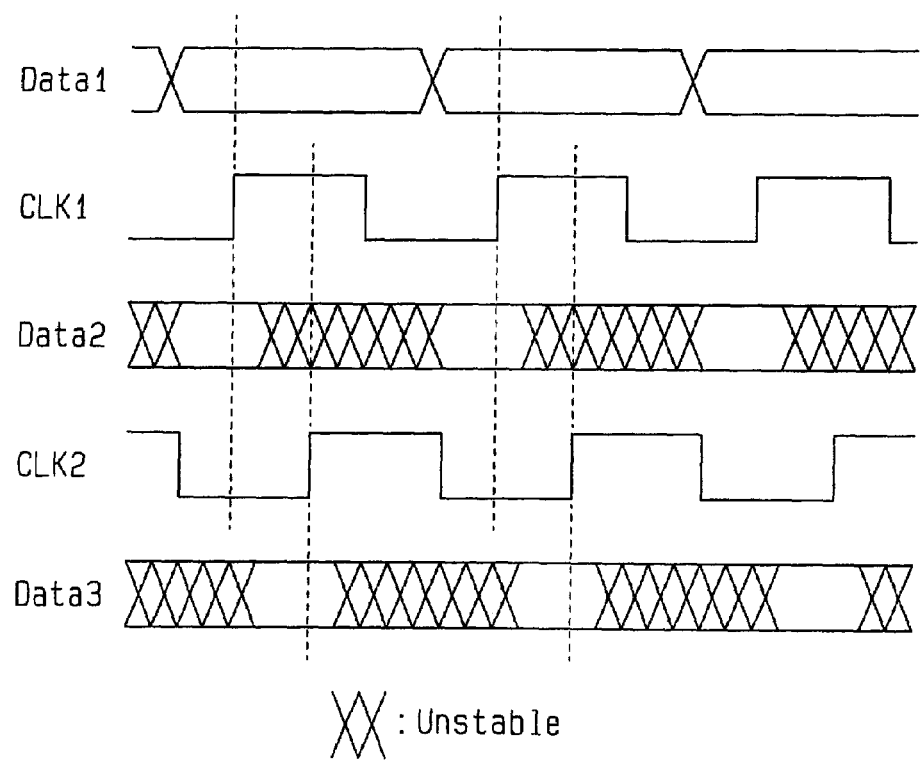
FIG. 12 is a timing and waveform diagram illustrating the transfer of data in the semiconductor device of FIG. 11.

FIG. 11 shows an example in which data is transferred between two digital circuits DC1 and DC2 that perform power fluctuation inhibiting. When the phase of the clock signal CLK2, which drives the digital circuit DC2, is delayed from the phase of the clock signal CLK1, which drives the digital circuit DC1, the associated delay circuit 3 delays an output signal Data2 of the digital circuit DC1 and provides the digital circuit DC2 with an output signal Data3 of the delay circuit 3. In such a procedure, as shown in FIG. 12, the digital circuit DC1 receives an input signal Data1 in accordance with the clock signal CLK1 and generates the output signal Data2. In this state, the digital circuit DC1 generates a stable output signal Data2 after a predetermined time from when the input signal Data1 is received.

The delay circuit 3 delays the output signal Data2 of the digital circuit DC1 to generate output signal Data3 and provides the digital circuit DC2 with the output signal Data3. The delay time of the delay circuit 3 set by the selection signal S2 is set so that it is the same as the delay time of a delay circuit (not shown) that sets the delay time of the clock signal CLK2.

When the clock signal CLK2 goes high, the digital circuit DC2 receives the output signal Data3. The output signal Data3 is synchronized with the clock signal CLK2 and delayed. Thus, the digital circuit DC2 retrieves the output signal Data3 while ensuring sufficient setup/hold time.

The power fluctuation inhibiting device according to the present invention has the advantages described below.

(1) The phases of the clock signals CLK1 to CLKn, which are provided to the respective digital circuits DC1 to DCn powered by the same power supply V2, are deviated from one another to offset noises generated in the power supply V2. This suppresses the peak values of the noise generated in the power supply V2 and reduces the number of noise peaks generated in the power supply V2.

(2) The power fluctuation measuring circuit 1 measures the peak values of the noise in the power supply V2, and the control circuit 2 adjusts the phases of the clock signals CLK1 to CLKn of the digital circuits DC1 to DCn to minimize the peak values. In other words, phase adjustment is preformed automatically.

(3) The power fluctuation measuring circuit 1 and the control circuit 2 are configured on the same semiconductor substrate as the digital circuits DC1 to DCn.

(4) The phases of the clock signals provided to the digital circuits are adjusted so that power supply noises generated by digital circuits of different circuit scales are offset by one another. Accordingly, the peak values of the power supply noises are suppressed.

(5) When the power supply noise of each digital circuit is generated during 2/n of a cycle of the clock signal, the phases of an n number of digital circuits are deviated from one another by 1/n of a cycle. This offsets the power supply noises generated by the digital circuits and suppresses the peak values of the power supply noises.

(6) When transferring data between digital circuits that inhibit power fluctuation, data is transferred from the digital circuit DC1 to the digital circuit DC2 via delay circuits 3 that set a delay time, which is the same as the delay time of the delay circuit that adjusts the phase of the clock signal. Accordingly, the digital circuit DC2 ensures sufficient setup/hold time for receiving the input signal.

It should be apparent to those skilled in the art that the present invention may be embodied in many other specific forms without departing from the spirit or scope of the invention. Particularly, it should be understood that the present invention may be embodied in the following forms.

Clock signals may be adjusted to offset the power supply noises between analog circuits instead of digital circuits.

Clock signals may be adjusted to offset power supply noises between digital circuits and analog circuits.

The present examples and embodiments are to be considered as illustrative and not restrictive, and the invention is not to be limited to the details given herein, but may be modified within the scope and equivalence of the appended claims.

What is claimed is:

1. A device for inhibiting fluctuation of power supply voltage that is supplied to a plurality of internal circuits, wherein the internal circuits are operated in accordance with a plurality of clock signals, the device comprising:
- a power fluctuation measuring circuit for measuring fluctuation peaks in the power supply produced when the internal circuits are operated and generating a measuring signal; and
- a clock signal control circuit connected to the power fluctuation measuring circuit to adjust phases of the clock signals provided to respective ones of the internal circuits so that the fluctuation peaks in the power supply voltage produced when the internal circuits are operated are substantially offset by one another.

2. The device according to claim 1, wherein the clock signal control circuit includes:
- a plurality of delay circuits, each connected to a respective one of the internal circuits, wherein each of the delay circuits selects the phase of the respective clock signal in accordance with a corresponding selection signal and provides the clock signal having the selected phase to the associated internal circuit; and
- a control circuit connected to the power fluctuation measuring circuit to generate the selection signal in accordance with the measuring signal and provide the selection signal to the respective delay circuit so that the peaks are minimized.

3. The device according to claim 2, wherein the control circuit sequentially switches the selection signals provided to the respective delay circuits to determine the selection signal that minimizes the peaks in accordance with the measuring signal generated by measuring the peaks whenever the selection signals are switched.

4. The device according to claim 2, wherein the control circuit provides the power fluctuation measuring circuit with a digital signal, the power fluctuation measuring circuit including:
- a D/A converter connected to the control circuit for converting the digital signal to an analog reference voltage;
- a peak hold circuit for holding the peaks of the power supply voltage; and
- a comparator connected to the D/A converter and the peak hold circuit for comparing the analog reference voltages with the held peaks to generate the measuring signal.

5. The device according to claim 4, wherein the D/A converter generates an analog high reference voltage and an analog low reference voltage based on the digital signal, the peak hold circuit holds a high potential peak and a low potential peak of the power supply voltage, and the comparator compares the analog high reference voltage with the held high potential peak to generate a first measuring signal and compares the analog low reference voltage with the held low potential peak to generate a second measuring signal.

6. The device according to claim 1, wherein the plurality of internal circuits include a first internal circuit and a second internal circuit, the device further comprising:
- a delay circuit connected between the first and second internal circuits to provide a signal of the first internal circuit to the second internal circuit at a delayed time that is substantially the same as the difference between the phase of the clock signal provided to the first internal circuit and the phase of the clock signal provided to the second internal circuit.

7. A semiconductor device comprising:
- a plurality of internal circuits, each operated in accordance with a respective one of a plurality of clock signals;
- an inhibiting device for inhibiting fluctuation of power supply voltage that is supplied to the internal circuits, wherein the inhibiting device includes:
  - a power fluctuation measuring circuit for measuring fluctuation peaks in the power supply produced when the internal circuits are operated and generating a measuring signal; and
  - a clock signal control circuit connected to the power fluctuation measuring circuit to adjust phases of the clock signals provided to respective ones of the internal circuits so that the fluctuation peaks in the power supply voltage produced when the internal circuits are operated are substantially offset by one another.

8. The semiconductor device according to claim 7, wherein the inhibiting device and the internal circuits are configured on the same substrate.

9. The device according to claim 7, wherein the clock signal control circuit includes:
- a plurality of delay circuits, each connected to a respective one of the internal circuits, wherein each of the delay circuits selects the phase of the respective clock signal in accordance with a corresponding selection signal and provides the clock signal having the selected phase to the associated internal circuit; and
- a control circuit connected to the power fluctuation measuring circuit to generate the selection signal in accordance with the measuring signal and provide the selection signal to the respective delay circuit so that the peaks are minimized.

10. The device according to claim 9, wherein the control circuit sequentially switches the selection signals provided to the respective delay circuits to determine the selection signal that minimizes the peaks in accordance with the measuring signal generated by measuring the peaks whenever the selection signals are switched.

11. The device according to claim 9, wherein the control circuit provides the power fluctuation measuring circuit with a digital signal, the power fluctuation measuring circuit including:
- a D/A converter connected to the control circuit for converting the digital signal to an analog reference voltage;
- a peak hold circuit for holding the peaks of the power supply voltage; and
- a comparator connected to the D/A converter and the peak hold circuit for comparing the analog reference voltages with the held peaks to generate the measuring signal.

12. The device according to claim 11, wherein the D/A converter generates an analog high reference voltage and an analog low reference voltage based on the digital signal, the peak hold circuit holds a high potential peak and a low potential peak of the power supply voltage, and the comparator compares the analog high reference voltage with the held high potential peak to generate a first measuring signal and compares the analog low reference voltage with the held low potential peak to generate a second measuring signal.

13. The device according to claim 7, wherein the plurality of internal circuits include a first internal circuit and a second internal circuit, the device further comprising:
- a delay circuit connected between the first and second internal circuits to provide a signal of the first internal circuit to the second internal circuit at a delayed time that is substantially the same as the difference between the phase of the clock signal provided to the first internal circuit and the phase of the clock signal provided to the second internal circuit.

14. A method for inhibiting fluctuation of power supply voltage that is supplied to a plurality of internal circuits, the method comprising:

providing a plurality of internal circuits with a plurality of clock signals, respectively; and adjusting phases of the clock signals to substantially offset a plurality of fluctuation peaks of the power supply voltage that are produced when the internal circuits are operated.

15. A method for inhibiting fluctuation of power supply voltage that is supplied to a plurality of internal circuits including a relatively large first internal circuit and relatively small second internal circuits, the method comprising:

providing the plurality of internal circuits with a plurality of clock signals, respectively; and adjusting phases of the clock signals to substantially offset a first peak in the fluctuation of the power supply voltage that is produced when the first internal circuit is operated with second peaks in the fluctuation of the power supply voltage that are produced when the second internal circuits are operated.

16. A method for inhibiting fluctuation of power supply voltage that is supplied to an n number of digital circuits, the method comprising:

providing an n number of clock signals to the n number of digital circuits, respectively; and when a cycle of noise produced in the power supply voltage during operation of each digital circuit is 2/n of a cycle of the respective clock signal, offsetting a plurality of fluctuations of the power supply voltage produced with the n number of digital circuits by deviating cycles of the n number of clock signals from one another by 1/n of a cycle.

* * * * *